T. M. SMITH.
AUTOMOBILE SIGNAL.
APPLICATION FILED JAN. 30, 1917.
1,248,188.
Patented Nov. 27, 1917.
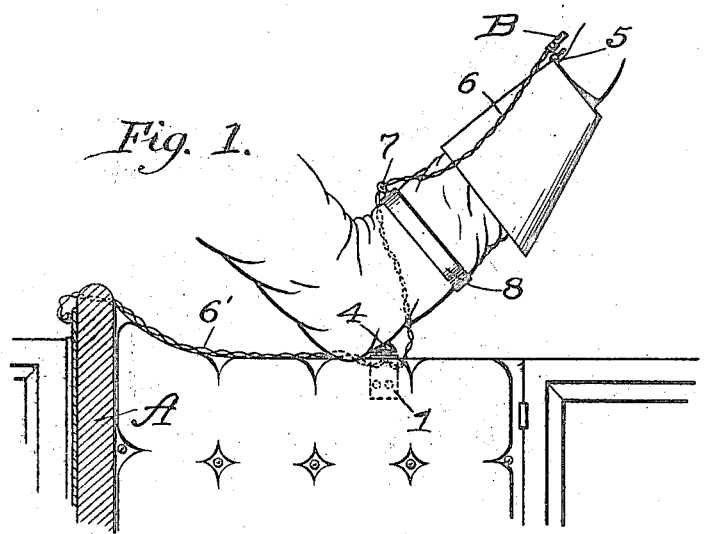
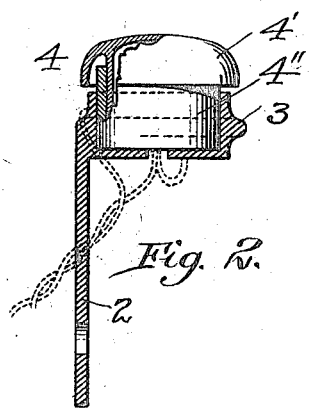
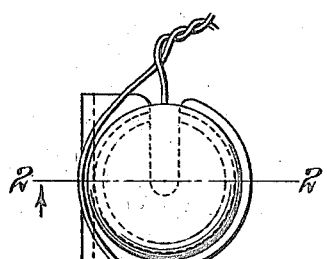
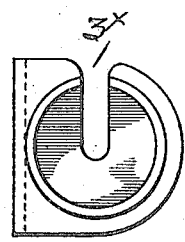
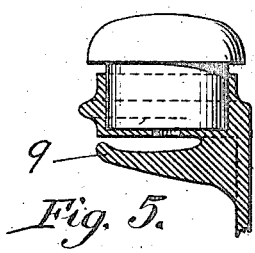
Inventor
Thomas Marshall Smith

UNITED STATES PATENT OFFICE.

THOMAS MARSHALL SMITH, OF BALTIMORE, MARYLAND.

AUTOMOBILE-SIGNAL.

1,248,188.  Specification of Letters Patent.  Patented Nov. 27, 1917.

Application filed January 30, 1917. Serial No. 145,545.

*To all whom it may concern:*

Be it known that I, THOMAS MARSHALL SMITH, a citizen of the United States, and resident of Baltimore, Maryland, have invented certain new and useful Improvements in Automobile-Signals, of which the following is a specification.

My present invention is an improvement upon that disclosed in application for Letters Patent of the United States, filed December 18th, 1916, Serial Number 137,693, one purpose of the present invention being to provide means whereby the current to the lamp will be normally cut off but the circuit may be closed by the act of the driver in placing his arm in position to give the desired signal.

In the accompanying drawings;

Figure 1 is a view partly in section of a portion of the frame and seat of an automobile representing the arm of the driver in position to give the signal and the circuit to the lamp being closed.

Fig. 2 is a sectional view of a fixture to be attached to the frame of the seat to hold the electric circuit closing device, which is shown in position in the fixture.

Fig. 3 is a plan view of Fig. 2.

Fig. 4 is a plan view of the fixture with the electric circuit closing device omitted.

Fig. 5 is a view of a modified form of fixture.

In these drawings A indicates the frame of the vehicle seat and 1 a fixture attached thereto along the side arm or margin thereof. This fixture may be of cast metal, having a standard portion 2, Fig. 2, and a socket portion 3, the latter receiving a circuit closing device 4 of any suitable standard pattern. In the form shown this circuit closing device has a head portion 4' and a body portion 4'' and depressing the head portion the circuit is closed in the ordinary manner to light a signal lamp.

In the form illustrated in Fig. 1 this lamp is indicated at B, it being mounted on a suitable bracket having a clamp 5 by which the lamp may be attached to the sleeve of the driver or to the gauntlet of his glove. From this lamp the circuit wires 6 extend to a guide or holder 7 which may be in the form of an eye attached to a clamping member 8 adapted to be clamped on the arm of the driver. The circuit wires 6 extend to the contact or circuit closing device 4 and thence through the portion 6' to a suitable socket on the frame of the vehicle from whence the circuit wires may run to a battery carried by the vehicle.

It will be noticed from Fig. 1 that the position of the circuit closing device is such relative to the seat that the driver readily can press his arm upon this circuit closing device after taking his hand off the wheel and in the act of moving his arm out laterally to give the signal, and having brought his arm into this lateral position in respect to the car and having borne upon the circuit closing device current will be supplied to the lamp B and as this is mounted adjacent the wrist of the driver the light will be displayed well toward one side of the car for observation by the occupants of a car following or by a crossing policeman or pedestrian.

It will be noted that the same act which brings the arm of the driver in position to give the signal brings the pressure of his arm to bear on the circuit closing device, and if desired the circuit may be maintained while the driver's arm is thus thrown out laterally or by working his arm up and down repeated flashes of the signal can be given during the time that his arm is thus extended laterally from the car.

It will be understood that the lamp is readily detachable from the sleeve, gauntlet or other support which may be worn by the driver and the clamp 8 is also readily detachable and this clamp may be simply a divided spring ring.

By detaching this clamp from the arm and the lamp from the sleeve, gauntlet or other support the whole lighting device may be left on the car, upon the driver leaving it.

I do not limit myself to the position of the lamp shown as this may be located differently and apart from the arm.

In order to prevent undue strain on the point of attachment of the circuit wires with the circuit closer which might result from an accidental pull on the circuit wires I provide means for engaging or gripping the circuit wires adjacent the socket and while this may be of different forms and may be differently arranged I prefer to mount this device on the same support which carries the socket as indicated at 9, Fig. 5, it being noted that this device consists of an arm with a narrow slot between the same and the base of the socket into which slot the wires may be forced to grip them and thus strain exerted by a pull upon the circuit wires will be resisted by the grip thus afforded and will be prevented from being communicated to the point where the circuit wires are connected with the circuit closing device. The circuit wires may be wrapped once around the holder 9 if desired.

The socket 3 is provided with a slot 3× in its side and bottom for the circuit wires to pass through.

What I claim is:

1. In combination, a signal lamp, with means for supporting the same on the arm of the driver, circuit connections leading to said lamp, and a circuit closer in said connections, said circuit closer being located in position to be borne upon by the arm of the driver and at his will when this is extended laterally from the vehicle to display the signal, the said circuit being normally open, substantially as described.

2. In combination a signal lamp to be attached to the arm of the driver, circuit connections leading thereto, a guide also attached to the arm of the driver for holding said circuit connections in rear of the lamp, a circuit closer arranged at a position to one side of the seat of the vehicle to be borne upon for closing said circuit by the arm of the driver and at his will when extended laterally from the vehicle, the said circuit to the lamp being normally open, substantially as described.

3. In combination with a signal lamp, with means for attaching it to the arm of the driver, circuit connections extending from said signal lamp, a circuit closer adapted to be secured to the frame of the vehicle in position to be borne upon by the arm of the driver in giving the signal by extending his arm laterally from the car, a support for the circuit closer, said circuit closer together with the circuit wires being freely removable from said support, substantially as described.

4. In combination with a signal lamp, with means for attaching it to the arm of the driver, circuit connections extending from said signal lamp, a circuit closer adapted to be secured to the frame of the vehicle in position to be borne upon by the arm of the driver in giving the signal by extending his arm laterally from the car, a support for the circuit closer, said circuit closer together with the circuit wires being freely removable from said support, and means adjacent the said circuit closer for engaging the circuit connections to prevent strain on the circuit connections, substantially as described.

In testimony whereof, I affix my signature.

THOMAS MARSHALL SMITH.